United States Patent [19] [11] 4,248,602
Niermann et al. [45] Feb. 3, 1981

[54] PRODUCTION OF PHOSPHORUS PENTASULFIDE OF PREDETERMINED REACTIVITY

[75] Inventors: Hermann Niermann, Erftstadt; Günter Reichert, Bornheim-Merten; Hans Ebert, Erftstadt; Friedrich Neumann, Holzwickede, all of Fed. Rep. of Germany

[73] Assignee: Hoechst Aktiengesellschaft, Fed. Rep. of Germany

[21] Appl. No.: 66,871

[22] Filed: Aug. 15, 1979

[30] Foreign Application Priority Data

Aug. 21, 1978 [DE] Fed. Rep. of Germany ....... 2836502

[51] Int. Cl.³ .............................................. C01B 25/14
[52] U.S. Cl. .............................. 23/293 R; 241/101 B; 423/303
[58] Field of Search ..................... 423/303; 241/101 B; 23/293 R

[56] References Cited

U.S. PATENT DOCUMENTS

| 3,146,069 | 8/1964 | Robota | 423/303 |
| 4,173,621 | 11/1979 | Krause et al. | 423/303 |

FOREIGN PATENT DOCUMENTS

| 923330 | 4/1963 | United Kingdom | 423/303 |
| 1071368 | 6/1967 | United Kingdom | 423/303 |

Primary Examiner—Hiram Bernstein
Attorney, Agent, or Firm—Connolly and Hutz

[57] ABSTRACT

The invention provides a process wherein a mixture prepared from starting materials comprised of $P_2S_5$ of high reactivity and low reactivity, respectively, is converted to phosphorus pentasulfide of predetermined reactivity lying between that of the high reactivity $P_2S_5$ and that of the low reactivity $P_2S_5$ starting materials. To this end, the starting materials are mixed in quantitative proportions which are selected in accordance with the respective reactivity of the starting materials and the resulting mixture is ground.

1 Claim, 1 Drawing Figure

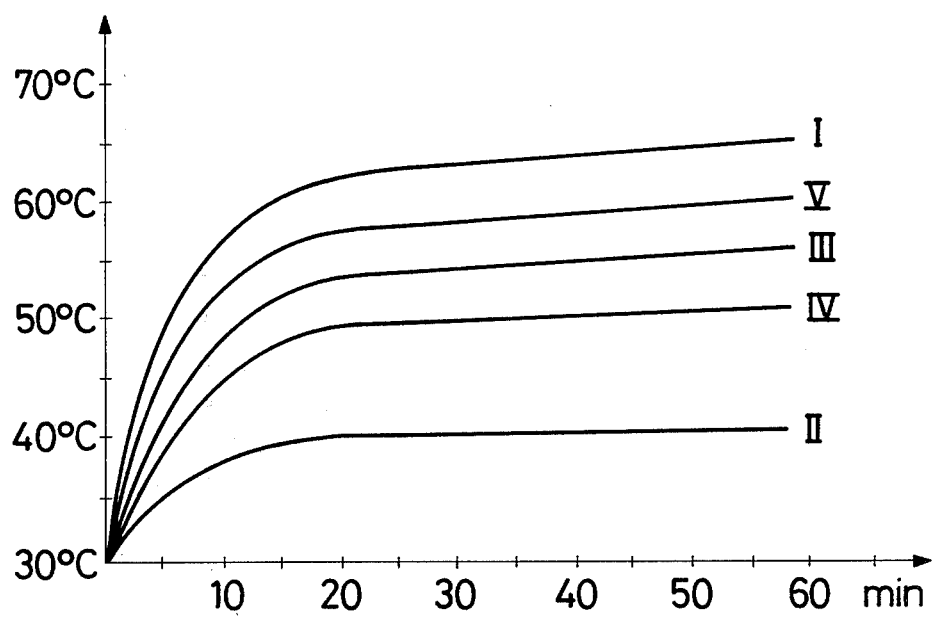

PRODUCTION OF PHOSPHORUS PENTASULFIDE OF PREDETERMINED REACTIVITY

The present invention relates to a process for making phosphorus pentasulfide ($P_2S_5$) of predetermined reactivity.

$P_2S_5$ exists in two modifications of which one is crystalline and the other glassy amorphous. The crystalline modification of $P_2S_5$ is obtained by allowing a $P_2S_5$ melt to solidify gradually in relatively large containers, and the glassy amorphous modification is obtained by causing a relatively thin $P_2S_5$-layer to solidify rapidly on a cooled surface. The two modifications have gained commercial interest for the reaction of $P_2S_5$ with alcohols, phenols and similar materials. It is known that the amorphous modification reacts rapidly and that the crystalline modification reacts reluctantly, in accordance with their thermodynamic energy content.

In commercial processes, it is often necessary to use $P_2S_5$-grades of which the reaction behaviour (reactivity) lies between that of the glassy amorphous modification and that of the crystalline modification. Various processes for the production of such special grade $P_2S_5$ have already been described. U.S. Pat. Nos. 3,146,069 and 3,282,653, for example, disclose processes, wherein the glassy amorphous modification is heated for some prolonged time to temperatures of 150° to 250° C. so as to reduce its reactivity. A further process has been described in U.S. Pat. No. 3,023,086, wherein the cooling conditions are varied and the solidification reaction is modified in respect of time so as to obtain $P_2S_5$ with a reactivity lying between that of the highly reactive amorphous modification and that of the low-reactive crystalline modification.

These are products which show the reation behaviour typical of homogeneous material, i.e. the reaction of an alcohol, for example, with $P_2S_5$ so made occurs along a continuous rectilinear temperature/time-path. This, however, would not have been expected to be the case with mixtures of $P_2S_5$ of low and high reactivity, respectively, inasmuch as the two modifications could reasonably be assumed to react successively, i.e. the high reactivity modification first and the low reactivity modification thereafter.

The present invention now unexpectedly provides a process for converting a mixture prepared from starting materials comprised of $P_2S_5$ of high reactivity and low reactivity, respectively, to phosphorus pentasulfide of predetermined reactivity lying between that of the high reactivity $P_2S_5$ and that of the low reactivity $P_2S_5$ starting materials, which comprises: mixing the starting materials in quantitative proportions which are selected in accordance with the respect reactivity of the starting materials and grinding the resulting mixture with the resultant formation of final $P_2S_5$ of which the reactivity is the higher the higher the proportion of high reactivity $P_2S_5$ starting material in the mixture, and vice versa.

The sole FIGURE of the drawing shows a graph for the temperature/time curves for reaction of $P_2S_5$ of Examples 1–5 described hereinafter.

The present process permits $P_2S_5$ of accurately predetermined reactivity to be produced with little expenditure of machinery which is highly desirable under commercial aspects.

Thus, for example, it is possible to place highly reactive scaly $P_2S_5$ in a reservoir and less reactive lumpy $P_2S_5$ in another reservoir and, with the use of two feed screw conveyors, to deliver the materials separately to a grinding mechanism. By controlling the velocity of the screw conveyors, it is possible to deliver any quantity of the two materials to the grinding mechanism and in this manner to produce final $P_2S_5$ of predetermined reactivity.

The following Examples illustrate the invention which is, however, not limited thereto.

EXAMPLE 1

(High reactivity $P_2S_5$)

Highly reactive scaly $P_2S_5$ was removed from a water-cooled cylinder, placed in a reservoir, delivered by means of a bucket wheel dosing lock to a grinding mechanism and finely ground. The ground material had a reactivity of 35.4° C./h, with respect to ethyl hexanol.

EXAMPLE 2

(Low reactivity $P_2S_5$)

Liquid $P_2S_5$ was filled into a 60 liter tank and allowed to solidify therein without being specially cooled. After cold, it was crushed and placed in a reservoir. Next, it was delivered by means of a bucket wheel dosing lock to a grinding mechanism and ground. The ground pulverant $P_2S_5$ had a reactivity of 10.3° C./h.

EXAMPLE 3

Highly reactive scaly $P_2S_5$ (Example 1) and low-reactive lumpy $P_2S_5$ (Example 2) coming from respective reservoirs were delivered jointly and separately to a grinding mechanism and ground. The bucket wheel dosing locks running to the grinding mechanism were operated at a controlled speed necessary to have a mixing ratio of about 1:1. The ground pulverulent $P_2S_5$ had a uniform reactivity of 26.5° C./h.

EXAMPLE 4

The bucket wheel dosing locks delivering highly reactive scaly $P_2S_5$ and low-reactive lumpy $P_2S_5$ to the grinding mechanism were operated at a velocity necessary to supply scaly and lumpy $P_2S_5$ in a mixing ratio of about 1:2. The ground pulverulent $P_2S_5$ had a reactivity of 21.4° C./h.

EXAMPLE 5

The bucket wheel dosing locks delivering highly reactive scaly $P_2S_5$ and low-reactive lumpy $P_2S_5$ to the grinding mechanism were operated at a velocity necessary to supply scaly and lumpy $P_2S_5$ in a mixing ratio of about 2:1. The ground pulverulent $P_2S_5$ had a reactivity of 31.4° C./h.

Plotted in the accompanying diagram are the temperature/time curves for reaction of $P_2S_5$ (Examples 1 to 5) with ethyl hexanol, curve I relating to Example 1, curve II to Example 2 etc.

As can be seen from curves 3 to 5, the reactions effected with the mixtures of the present invention were also found to occur along a continuous rectilinear temperature/time path. It can also be seen that the reactivity of these mixtures can be varied directly by varying the mixing ratio of the $P_2S_5$ starting materials.

The reaction heat set free during the reaction of $P_2S_5$, expressed in ° C./h, is an index of the reactivity of $P_2S_5$, with respect to ethyl hexanol.

We claim:

1. A process for converting a mixture prepared from starting materials comprised of $P_2S_5$ of high reactivity and low reactivity, respectively, to phosphorus pentasulfide of predetermined reactivity lying between that of the high reactivity $P_2S_5$ and that of the low reactivity $P_2S_5$ starting materials, which comprises: mixing the starting materials in quantitative proportions which are selected in accordance with the respective reactivity of the starting materials and grinding the resulting mixture with the resultant formation of final $P_2S_5$ of which the reactivity is the higher the higher the proportion of high reactivity $P_2S_5$ starting material in the mixture, and vice versa.

* * * * *